United States Patent [19]

Nishida et al.

[11] Patent Number: 5,496,888
[45] Date of Patent: Mar. 5, 1996

[54] RESIN COMPOSITIONS FOR ELECTROPHOTOGRAPHIC TONER AND PROCESS FOR MAKING THE SAME

[75] Inventors: Masaharu Nishida, Yamashina; Tohru Ohhama, Higashiyama, both of Japan

[73] Assignee: Sanyo Chemical Industries, Ltd., Kyoto, Japan

[21] Appl. No.: 212,867

[22] Filed: Mar. 15, 1994

Related U.S. Application Data

[63] Continuation-in-part of Ser. No. 127,175, Sep. 28, 1993, abandoned.

[51] Int. Cl.⁶ ........................................ C08L 67/00
[52] U.S. Cl. .................... 525/63; 525/90; 525/91; 525/92 F; 525/92 L; 525/166; 525/175; 525/176; 525/177; 525/186
[58] Field of Search .................. 525/176, 63, 90, 525/91, 92 F, 92 L, 166, 175, 176, 177, 186

[56] References Cited

U.S. PATENT DOCUMENTS

| | | |
|---|---|---|
| 4,518,673 | 5/1985 | Noguchi et al. . |
| 4,713,310 | 12/1987 | Horie . |
| 4,795,689 | 1/1989 | Matsubara et al. . |
| 4,845,006 | 7/1989 | Matsubara et al. . |
| 4,908,290 | 3/1990 | Watanabe et al. . |
| 4,931,375 | 6/1990 | Akimoto et al. . |
| 5,185,405 | 2/1993 | Nishida . |
| 5,318,871 | 6/1994 | Inagaki et al. ............... 430/106 |

FOREIGN PATENT DOCUMENTS

2166939   7/1973   France .

OTHER PUBLICATIONS

Patent Abstracts of Japan, vol. 9, No. 253, Japan Lay–Open No. 102,646/1985, "Heat Fixing Toner", Oct. 11, 1985.
Database WPI, AN 92–263191, Japan Lay–Open No. 178, 658/1992, "Resin Composition for toner for Copier, Laser Printer, etc. . . . Having Specified Mol. Wt.", Nov. 14, 1990.

*Primary Examiner*—Ana L. Carrillo
*Attorney, Agent, or Firm*—Oblon, Spivak, McClelland, Maier & Neustadt

[57] ABSTRACT

Resin compositions, comprising (A) a styrene/acrylic polymer and (B) a polyester dispersed therein with an average particle size of not more than 3 μ, are obtained by quenching a mixture of (A) and (B) melted at 150°–200° C., below the glass transition temperature of the polymer (A) within 5 minutes, and are of good thermal shelf stability and electrical properties and provide toner binders of high hot offset causing temperature and improved low temperature fixing properties.

20 Claims, No Drawings

RESIN COMPOSITIONS FOR ELECTROPHOTOGRAPHIC TONER AND PROCESS FOR MAKING THE SAME

This application is a continuation-in-part application of U.S. Ser. No. 08/127,175, filed on Sep. 28, 1993, now abandoned.

BACKGROUND OF THE INVENTION

1. Field of the Invention

This invention relates to resin compositions suitable for toner. More particularly, it relates to resin compositions suitable as binder for electrophotographic toner.

2. Description of the Prior Art

In electrophotography (xerography), for fixing electrostatic latent images visualized with use of a developing toner, there have been widely used methods using fixing means of contact heating, such as those with a heated roller and those via a film or a between a heater and paper or the like (for example, JPN Patent Lay-open No. 70688/1992 and No. 12558/1992. In these methods, it is desired that the minimum temperature for fixing (hereinafter referred to as MF) is low (low temperature fixing properties) and the temperature causing offset to the heated roller (hereinafter referred to as HO) is high (anti-hot offset properties). Thermal shelf stability is also desired so as not to cause coagulation (or agglomeration) and reduction of flowability under heat evolved from fixers within electrophotographic machines.

In order to meet these requirements, there have been heretofore proposed various techniques using toner binders having wide range of molecular weight distribution from lower molecular weight to higher molecular weight and having a glass transition temperature (hereinafter referred to as Tg) (for example, JPN Patent Publications No. 20411/1985 and JPN Patent Lay-open No. 21555/1986), and those using toners mainly composed of heat reaction products of non-crystallizable polyester resins with vinyl copolymer resins (for instance JPN Patent Lay-open No. 277074/1990).

In these techniques, there are drawbacks, that the formers cannot sufficiently answer to fixing properties at lower temperature required in racent high speed facsimile or copy machines, or to higher thermal shelf stability desired accompanied with miniaturization of printers; and that the latters result in poor dispersibility of colorants and charge controllers, insufficient frictional charge amount, liablity of vinyl resin bleeding out of polyester resin matrix to toner surface, and difficulty in viscosity reduction.

SUMMARY OF THE INVENTION

It is an object of the present invention to provide a resin composition capable of providing a toner having desired properties of low MF and high HO.

It is another object of the present invention to provide a toner binder of improved thermal shelf stability.

It is still another object of the present invention to provide a toner of improved electrical properties, such as frictional charge amount.

It is yet another object of the present invention to provide a method of a toner binder of improved dispersibility and lower viscosity.

Briefly, these and other objects of this invention as hereinafter will become more readily apparent have been attained broadly by a resin composition suitable for electrophotographic toner, which comprises (A) a styrenic/(meth)acrylic polymer having a Tg of 55°–80° C., and (B) a polyester having a Tg of 20°–60° C., said polyester (B) having an average diameter of dispersed particles of not more than 3 μ.

DETAILED DESCRIPTION OF THE PREFERRED EMBODIMENTS (A) Styrenic/(meth)acrylic Polymer Suitable polymers (A) include non-crosslinked polymers having Tg of 55°–80° C., obtainable by polymerizing (a) styrenic monomer and/or (b) (meth)acrylic monomer, with or without another monomer (c).

In the above and hereinafter, (meth)acrylic monomer represents acrylic monomer and/or methacrylic monomer, and similar expressions are used.

Suitable styrenic monomer (a) include, for example, those represented by the formula (1).

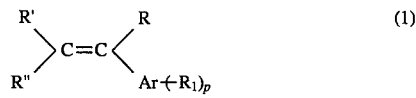

In the formula (1), R, R' and R" are independently selected from the group consisting of hydrogen and lower alkyl; $R_1$ is selected from the group consisting of hydrogen, $C_1$–$C_{10}$ alkyl, phenyl, lower alkoxy and halogen; Ar is an aromatic hydrocarbon group (such as phenylene); and p is an integer of 0–3.

Exemplary of said monomers (a) are styrene; and styrene homologues or substituted styrenes, including alkyl ($C_1$–$C_8$) styrenes (such as α-methylstyrene, o-, m- and p-methylstyrenes, p-ethylstyrene, 2,4-dimethylstyrene, p-n-butylstyrene, p-t-butylstyrene, p-n-hexylstyrene, p-n-octylstyrene, p-n-nonylstyrene, p-n-decylstyrene, aryl-substituted styrenes (such as p-phenylstyrene), alkoxy-substituted styrenes (such as p-methoxystyrene), halogen-substituted styrenes (such as p-chlorostyrene, 3,4-dichlorostyrene); and mixtures of two or wore of them (such as mixtures of styrene with one or more styrene homologues). Among these, preferred is styrene.

Suitable (meth)acrylic monomer (b) include esters of (meth)acrylic acids, for example, alkyl ($C_1$–$C_{18}$) (meth)acrylates, such as methyl, ethyl, n- and i-butyl, propyl, n-octyl, 2-ethylhexyl, dodecyl, lauryl and stearyl (meth)acrylates; aryl (meth)acrylates, such as phenyl (meth)acrylates; hydroxyl-containing (meth)acrylates, such as hydroxyethyl (meth)acrylates; amino-containing (meth)acrylates, such as dimethylaminoethyl and diethylaminoethyl (meth)acrylates; epoxy-containing (meth)acrylates, such as glycidyl (meth)acrylates; (meth)acrylic acids and derivatives thereof, such as (meth)acrylonitriles and (meth)acrylamides; and the like. Among these, preferred are alkyl (meth)acrylates [particularly methyl, ethyl, and 2-ethylhexyl (meth)acrylates] and (meth)acrylic acids, and mixtures of two or more of them.

Suitable other monomers (c), optionally used in producing polymers (A), include non-crosslinking monomers (monoethylenically unsaturated monomers and conjugated dienes), for example, maleic monomers, such as maleic anhydride, maleic acid, and esters thereof [mono- and di-alkyl($C_1$–$C_{18}$) maleares, such as monobutyl maleate]; vinyl esters, such as vinyl acetate and vinyl propionate; aliphatic hydrocarbon monomers, such as butadiene; vinyl ethers, such as vinylmethyl ether, vinylethyl ether and vinyl-iso-butyl ether; vinyl ketones, such as vinylmethyl ketone, vinyl hexyl ketone and methylisopropenyl ketone; N-vinyl compounds, such as N-vinylpyrrole, N-vinylcarbazole, N-vinylindole and N-vinylpyrrolidine; and the like. Among these, preferred are maleic monomers, vinyl esters and alihpatic hydrocarbon monomers.

In producing styrenic/(meth)acrylic polymers (A) in this invention, the contents of said monomers (a), (b) and (c) can be varied widely, but the amount of (c) is usually 0–10%, preferably 0–5%, based on the total monomers. Among these polymers (A), preferred are copolymers of said monomers (a) and (b) and optionally (c). Such copolymers preferably contain at least 50%, especially at least 60% of said monomer (a) and at least 2%, particularly at least 5% of said monomer (b). In the above and hereinafter, % represents % by weight.

Styrenic/(meth)acrylic polymers (A) may contain units of carboxylic acid monomer [such as (meth)acrylic acid and maleic acid], to facilitate dispersion of polyester (B). Such polymers preferably have an acid number (hereinafter referred to as AV) of not more than 30, especially 3–30, in view of temperature dependence of charge amount.

Styrenic/(meth)acrylic polymer (A) used in the present invention has Tg of generally 55°–80° C., preferably 60° C.–75° C. Tg lower than 55° C. results in poor heat shelf stability. Tg over 80° C. causes increase of MF.

Number-average molecular weight (hereinafter referred to as Mn) of said polymer (A) is usually about 2,000–about 20,000, preferably about 1,000–about 10,000. Mn lower than 2,000 results in poor thermal shelf stability, and Mn over 20,000 causes increase of MF. Weight-average molecular weight (hereinafter referred to as Mw), which can be measured by GPC (gel permeation chromatography) using tetrahydrofuran (hereinafter referred to as THF) with use of calibration curve of standard polystyrenes, of (A) is generally about 100,000–about 2,000,000, preferably about 200,000–about 1,000,000. Mw lower than 100,000 provides lower HO, and Mw more than 2,000,000 results in higher MF. Molecular weight distribution (Mw/Mn) of (A) is usually at least 3.5, preferably 20–40 or more.

Said polymer (A) can be produced by polymerizing said monomers (a) and/or (b) with or without said monomer (c), in the presence of one or more polymerization initiators, using any known polymerization techniques, such as solution polymerization, bulk polymerization, suspension polymerization and emulsion polymerization, and combinations of them (such as solution polymerization followed by suspension or bulk polymerization, or suspension polymerization followed by solution or bulk polymerization).

In order to attain polymers of broader molecular weight distribution, relatively lower molecular weight part and higher molecular weight part may be polymerized separately, or polymerization of one of these parts may be carried out in the presence of the rest of them.

(B) Polyester

Suitable polyesters (B) include non-crosslinked non-crystallizable saturated polyesters. There may be mentioned polyesters of high surface free energy. Such polyesters are inclusive of polycondensation products of diol with dibasic acid (or ester-forming derivative thereof).

Suitable diols include low molecular weight diols, for example, (1) aliphatic dihydric alcohols (glycols), such as ethylene glycol, propylene glycol, 1,3- and 1,4-butane diols, 1,6-hexane diol, neopentyl glycol, 3-methyl- 1,5-pentane diol, diethylene glycol and triethylene glycol, (2) dihydric phenols, such as hydroquinone, catechol, resorcinol, pyrogallol, and bisphenols [e.g. bisphenol A, bisphenol AD, bisphenol F and bisphenol S (bisphenol sulfon), (3) cycloaliphatic dihydric alcohols, such as 1,4 -dihydroxymethylcyclohexane, and hydrogenated bisphenols, and (4) adducts of alkylene oxide [ones containing 2–4 carbon atoms, such ethylene oxide and propylene oxide (hereinafter referred to as PO), and combination of them which may be added block-wise or random-wise] to these low molecular weight diols (1), (2) and/or (3); as well as mixtures of two or more of these diols. These diols have OH equivalent weight of usually 30–4,000, preferably 31–1,000. Among these, preferred are ethylene glycol, neopentyl glycol and alkylene oxide adducts (preferably 2– 3 moles adducts) of bisphenols (particularly bisphenol A), and mixtures of them. More preferred are alkylene oxide 2– 3 moles adducts of bisphenol A, neopentyl glycol, and mixtures of them.

Suitable dibasic acids include dicarboxylic acids, for example, aliphatic, aromatic and cycloaliphatic ones, such as succinic, maleic, fumaric, iraconic, azelaic, mesaconic, citraconic, sebacic, glutaconic, adipic, malonic, glutaric, phthalic, iso-phthalic, terephthalic, cyclohexane dicarboxylic, nadic and methyl-nadic acids, alkyl- or alkenyl($C_1$–$C_{20}$)-succinic acids (e.g. octyl-succinic and dodecenyl-succinic acids), and dimer acids, obtainable by dimerization of fatty acids (such as linoleic and linolenic acids); and mixtures of 2 or more of these acids; as well as ester-forming derivatives of these acids, for instance, anhydrides and lower alkyl esters, such as maleic and phthalic anhydrides, dimethyl terephtharate and the like. Among these, preferred are succinic, maleic, fumaric, phthalic, iso-phthalic, terephthalic, and alkyl- or alkenyl ($C_4$–$C_{18}$)-succinic acids.

There may be used monohydric alcohol (such as $C_1$–$C_{18}$ aliphatic alcohols) or monobasic acid (such as $C_2$–$C_{18}$ fatty acids, or anhydrides thereof) to block terminal carboxyl group or terminal hydroxyl group.

Polycondensation of diol with dibasic acid or ester-forming derivative thereof can be carried out under known conditions, for instance, at a temperature of usually 150°–300° C., with or without a catalyst (such as dibutyltin oxide, stannous oxide, tetrabutyl titanate and so on), under normal or reduced pressure, in the abcence of or in the presence of inert gas or solvent.

Illustrative of suitable polyesters are poly(oxyalkylated bisphenol A) iso-phthalates, polyethylene adipate, polybutylene adipate, polyhexamethylene adipate, polyneopentyl adipate, polyethylene/butylene adipate, poly-3 -methyl-1,5-pentane adipate and polybutylene iso-phthalate. Among these, preferred are poly(oxyalkylated bisphenol A) iso-phthalates.

Other examples of polyesters include ring-opening polymerization products of lactones [such as ∈-caprolactone, 3-methyl-valerolactone], for instance, polycaprolactone diol and poly-3-methyl-valerolactone diol; and polycarbonate diols, such as polyhexamethylene carbonate.

Said polyester (B) has a hydroxyl number (hereinafter referred to as OHV) of usually not more than 120, preferably not more than 100, and AV of usually not more than 5, preferably not more than 3, in view of charge amount of toner.

Tg of (B) is usually 20°–60° C., preferably 25°–55° C. Heat storage stability becomes poor in case of Tg lower than 20° C.; while Tg over 60° C. causes increase of MF. In view of low temperature fixability, it is preferred that (B) has Tg lower than (A). Tg of (B) is preferably lower by at least 5° C. than Tg of (A).

Mn of (B) is usually 1,000–4,000. Thermal shelf stability becomes poor when Mn is lower than 1,000, and low temperature fixability becomes worse when Mn is over 4,000. Mw of (B) is preferably 2,000–8,000.

In the present invention, said polyester (B) is dispersed, within matrix of said styrenic/(meth)acrylic polymer (A), with an average particle size of usually not more than 3 μ, preferably not more than 2.5 μ. When the average particle size is more than 3 μ, the resulting toner is of insufficient dispersibility of colorant and charge controller, reduced charge amount, and poor heat storage stability. Said polyester (B) with such an average particle size can be obtained by mixing said polyester (B) with said polymer (A) and (B) homogeneously under melting at a temperature of 150°–200° C., followed by quenching the melted mixture within 5 minutes below Tg of (A). When the temperature is lower than 150° C., it is too viscous to be easily handled in production, or the mixture becomes heterogeneous in some case. The temperature higher than 200° C. results in reduction of HO, caused by lowering the molecular weight through depolymerization of the high molecular weight region.

The composition of this invention comprises generally 2–25%, preferably 3–20%, more preferably 3–15% of said polyester (B), and usually 75–98%, preferably 80–97%, more preferably 85–97% of said polymer (A). The weight ratio of (B)/(A) is preferably 0.02/1–0.3/1, more preferably 0.05/1–0.25/1. The ratio lower than 0.02/1 is not preferred in view of low temperature fixibility, and the ratio higher than 0.3/1 provides dispersed (B) of larger particle size.

(C) Compatibilizer

The composition of the present invention may further contains a compatibilizer (C).

Suitable compatibilizers (C) include, for example, graft or block polymers having a moiety of styrenic and/or (meth)acrylic polymer and a moiety of a polyester.

Such graft or block polymers include those obtainable by polymerizing styrenic and/or (meth)acrylic monomer, in the presence of unsaturated polyester. Suitable styrenic and/or (meth)acrylic monomers include those mentioned the above (A). Examples of suitable unsaturated polyesters are polyesters containing polymerizable double bond introduced therein through unsaturated acid component (maleic anhydride), among the above-mentioned polyesters (B); and reaction products of unsaturated compound containing reactive group (such as isocyanate group, acid anhydride group and so on) [for example, (meth)acryloyl isocyanates and maleic anhydride] with polyester as mentioned above (B). The compatibilizer (C) contains usually 5–95%, preferably 10–90% of the styrenic and/or (meth)acrylic polymer moiety and usually 5–95%, preferably 10–90% of the polyester moiety.

The amount of compatibilizer (C) may be varied widely, for instance, 0–50% or more, based on the total weight of (A), (B) and (C). It is preferred to use the compatibilizer (C) containing the styrenic and/or (meth)acrylic polymer moiety and the polyester moiety in such an amount providing 5–120 parts by weight, more preferably 20–100 parts by weight of the polyester moiety of (C), per 100 parts by weight of said polyester (B).

Mn of resin composition of (A) and (B) and optionally (C) is usually about 2,000–about 15,000, preferably about 3,000–about 12,000, and Mw is about 100,000–about 1,000,000, preferably about 200,000–about 500,000. Mw/Mn is generally 10–150, preferably 20–80.

The resin composition preferably has a temperature providing a melt viscosity of 50,000 poises, which temperature is higher by at least 30° C. (particularly 40°–80° C.) than the temperature when said polyester (B) has a melt viscosity of 50,000 poises, in view of providing low temperature fixability. The melt viscosity of the resin composition can be regulated by selecting (B) of relatively low melt viscosity and varying the amount of (B).

(D) Other components

Resin compositions for toner binders, according to this invention, comprising said styrenic/(meth)acrylic polymer (A) and said polyester (B) and optionally said compatibilizer (C), may further contain one or more other components.

It is preferred to contain one or more lower molecular weight polyolefin (D). Mw of said polyolefin (D), which can be measured by GPC using o-dichlorobenzene at 135° C., is generally about 1,000–about 100,000, preferably about 5,000–about 60,000. Illustrative of said polyolefin (D) are:

(D1): polyolefins, for example, polyethylene, polypropylene, and copolymers of ethylene with alpha-olefin containing 3–8 carbon atoms (such as ethylene-propylene copolymer containing at least 50%, particularly at least 70% of propylene);

(D2): (D1) modified with adducts of (D1) with] maleic acid derivative (such as maleic anhydride, dimethyl maleate, diethyl maleate and di-2-ethylhexyl maleate);

(D3): oxydates of (D1);

(D4): copolymers of ethylenically unsaturated hydrocarbon (such as ethylene, propylene, butene-1 and the like) with ethylenically unsaturated carboxylic acid [such as (meth)acrylic acids, itaconic acid and the like] and/or ester thereof (such as $C_1$–$C_{18}$ alkyl esters); and mixtures of two or more of them.

Among the above polyolefins (D), (D1) may be obtained by thermal degradation (thermal decomposition) of high molecular weight polyolefin (Mw: usually about 10,000–about 2,000,000), or by polymerization of one or more olefins. (D2) can be obtained by addition reaction of maleic acid derivative with (D1), in the presence of or in the absence of peroxide catalyst. (D2) may be obtained by oxidation of (D1) with oxygen or oxygen-containing gas (such as air) or with ozone-containing oxygen or ozone-containing gas (air). Acid value of (D2) is usually at most about 100, preferably at most about 50. (D4) can be obtained copolymerization of ethylenically unsaturated hydrocarbon with ethylenically unsaturated carboxylic acid and/or ester thereof. The amount of ethylenically unsaturated carboxylic acid and/or ester thereof is generally at most about 30%, preferably at most about 20%.

The amount of said polyolefin (D) is usually at most about 30%, preferably about 1–about 20%, based on the total weight of the toner binder. Use of (D) more than 30% results in insufficient dispersibility.

(E) Toner composition

Electrophotographic toner, wherein the resin composition of the present invention is used as the toner binder, comprises generally about 45%–about 95% of the toner binder and may contain one or more of known colorants (inorganic and organic pigments, such as carbon black, iron black, benzidine yellow, quinacridone pigments, rhodamine B, phthalocyanine pigments and the like), in an amount of usually about 5%–about 10%; magnetic powders (such as powders of ferromagnetic metals and compounds, such as iron, cobalt, nickel, magnetite, hematite, ferrite and the like), in an amount of generally 0%–about 50%; and other additives [for example, charge controllers (such as metal complexes and nigrosine), lubricants (such as polytetrafluoroethylene, low molecular weight polyolefins, fatty acids and metal salts or amides thereof), and so on], in an amount of 0%–about 10%.

Said toner can be prepared by dry blending these components and then melted under kneading, followed by crushing, and then finely pulverizing with a grinder (such as jet grinder), thereafter classifying to obtain particles of 5–20 microns diameter.

Said toner can be optionally mixed with one or more carrier particles, such as iron powder, glass beads, nickel powder, ferrite and the like, and used as a developer for electrical latent images. Besides, hydrophobic colloidal silica powder may be used to improve flowability of powders.

Said toner can be fixed on substrates, such as paper, polyester film and the like. Fixation may be accomplished by any known Fixation means, such as heat roll fixation.

In accordance with the present invention, by using resin composition comprising at least two different resin, providing composite dispersed in matrix at the room temperature or so, when blended in solution followed by distilling off the volatile matter, and by using dispersed resin having higher surface free energy than the matrix resin, it become possible to lower Tg of the dispersed resin maintaining heat storage stability, with restraining bleeding out of the dispersed resin to toner surface. Thus, this invention has attained reduction of melt viscosity and improvement of low temperature fixability, without reducing heat storage stability. By quenching homogeneous mixture melted at 150° C.–200° C. according to the present invention, are obtained dispersed resin particles having an average diameter of 3.0 μ or less, which particles maintain sufficiently fine particle size even at kneading of toner within short residence time and therefore can disperse colorant (such as carbon black) and charge controller effectively. Matrix resin of the toner binder of this invention provides excellent charging properties. In addition, In the invention, the dispersed resin of lower Tg, having higher surface free energy than resin of higher Tg, is hard to be bleed out in making toner, and makes it possible to improve low temperature fixability without reducing heat storage stability.

Having generally described the invention, a more complete understanding can be obtained by reference to certain specific examples, which are included for purposes of illustration only and not intended to be limiting unless otherwise specified.

In the following examples, parts and ratio mean parts by weight and weight ratio, respectively.

Measuring methods and conditions are as follows:

1) Mw (molecular weight) measured with GPC:

Equipment: HCL-802A, produced by Toyo Soda Manuf.

Columns: TSK gel GMH6, 2 columns, produced by Toyo Soda Manuf.

Temperature: 25° C.;

Sample solution: 0.5% THF solution.

Amount of solution: 200 microlitters.

Detector: Refractometer.

Mw calibration curve was prepared using standard polystyrenes.

2) Tg:

Equipment: DSC20,SSC/580, produced by Seiko Electronics.

Conditions : ASTM D3418-2

3) Average particle size:

i) Photographing with a scanning electron microscope (SEM).
Equipment: S-800, produced by Hitachi.
Magnification: 400.

ii) Calculation of average particle size by printed image analysis of the above electron micrograph.

Printed image analyzer: LA-555, produced by Pias Co. calculated as an equivalent circle diameter 4) Confirmation that the dispersed resin composite become homogeneously dissolved at 150° C.

Equipment: KOFLER hot bench, Type WME, Nr.0772, produced by REICHERT-JUNG, Heizbank After temperature calibration with standard material, a binder resin specimen (about 10 mm×about 30 mm×about 5 mm thickness) is put on the hot bench and the state of haze of the resin is observed with eyes from horizontal direction. The temperature when the resin becomes transparent is considered as the homogeneously dissolved temperature.

5) Measurement of temperature providing melt viscosity of 50,000 poises

Equipment: Flow tester FT-500, produced by Shimadzu.

Die: 1 mmϕ×1 mm;

Load: 10 Kg/cm$^2$f;

Preheating period: 300 seconds;

Start temperature of heating up: 40° C.;

Heating rate: 6° C./minute;

Factor: K=1.0;

Recording interval: 5° C.;

Sample amount: 1.4 g.

Melt viscosity thus measured is plotted on semi-logarithmic paper, and the temperature at the intersection of 50,000 poises with straight line connecting these plots is read as the temperature providing melt viscosity of 50,000 poises.

Polyesters used in the Examples are as follows:

Polyester (B-1)

1,000 parts of PO (3 moles) adduct of bisphenol A were polycondensated with 318 pars of iso-phthalic acid to obtain 1,240 parts of a polyester (B-1) having AV of 1.0 mgKOH/g and OHV of 51 mgKOH/g, Mn of 2,500, Mw of 5,000 and Tg of 36° C. and having a melt viscosity of 50,000 poise at 75° C.

Polyester (B-2)

2,000 parts of PO (2 moles) adduct of bisphenol A were polycondensated with 682 pars of ]so-phthalic acid to obtain 2,520 parts of a polyester resin (B-2) having AV of 1.6 mgKOH/g and OHV of 56 mgKOH/g, Mn of 1,200, Mw of 3,500 and Tg of 50° C. and having a melt viscosity of 50,000 poise at 90° C.

Polyester (B-3)

3,168 parts of PO (2 moles) adduct of bisphenol A were polycondensated with 954 pars of iso-phthalic acid to obtain 3,880 parts of a polyester resin (B-3) having AV of 0.8 mgKOH/g and OHV of 92 mgKOH/g, Mn of 1,400, Mw of 2,700 and Tg of 42° C. and having a melt viscosity of 50,000 poise at 84° C.

EXAMPLE 1

Into a separable flask equipped with a stirrer and a condenser, were charged 11 parts of (B-1), 40 parts of a styrene/butyl acrylate (80/20) copolymer (A-H-1) having Mn of 220,000, Mw of 580,000 and Tg of 62° C. prepared through suspension polymerization and 60 parts of polystyrene (A-L-1) having Mn of 2,500, Mw of 5,900 and Tg of 58° C. prepared through solution polymerization, followed by substituting the atmosphere in the flask with nitrogen, then adding 120 parts of xylene and further substituting the atmosphere with nitrogen. The mixture was heated under stirring to a reflux temperature, and stirring was continued for additional 3 hours under reflux. Thereafter, the volatile matters were distilled off under normal pressure heating up to 180° C. and then under reduced pressure at 180° C., followed by continuing distillation for 1.5 hours after reaching 20 torrs.

The molten mixture was taken out into a vat to a thickness of 5 mm or so, followed by placing the vat on an iced vat and then putting another iced vat thereover to quenching the molten mixture sandwiched between the iced vats. After 5 minutes, the upper iced vat was removed, and the temperature of the quenched mixture was 17° C. as measured with a non-contact surface thermometer.

Analysis showed that the toner binder (TB-1) thus obtained had an average diameter of dispersed particles of 2.4 μ, Mn of 3,100, Mw of 150,000 and Tg of 55° C. and a melt viscosity of 50,000 poise at 132° C. and homogeneously dissolved at about 125° C.

COMPARATIVE EXAMPLE 1

Example 1 was repeated except that the molten mixture was taken out into a vat to a thickness of 4 cm or so, and allowed to cool without quenching. The surface temperature after 5 minutes was 110° C. Analysis showed that the resulting toner binder (TB-11) had an average diameter of dispersed particles of 6.3 μ, Mn of 3,100, Mw of 150,000 and Tg of 55° C. and a melt viscosity of 50,000 poise at 132° C. and homogeneously dissolved at about 130° C.

COMPARATIVE EXAMPLE 2

Example 1 was repeated without using (B-1). Analysis showed that the resulting toner binder (TB-12) had Mn of 4,000, Mw of 180,000 and Tg of 59° C. and a melt viscosity of 50,000 poise at 145° C. No haze of (TB-12) was observed.

COMPARATIVE EXAMPLE 3

Example 1 was repeated except that (B-1) was substituted with a styrene/n-butyl methacrylate (65/35) copolymer having Mn of 2,600, Mw of 5,800 and Tg of 36° C. Analysis showed that the resulting toner binder (TB-13) had Mn of 3,500, Mw of 160,000 and Tg of 56° C. and a melt viscosity of 50,000 poise at 138° C. No haze of (TB-13) was observed.

EXAMPLE 2

Example 1 was repeated except that (B-1) was substituted with (B-2). The surface temperature after 5 minutes was 16° C. Analysis showed that the toner binder (TB-2) thus obtained had an average diameter of dispersed particles of 2.4 μ, Mn of 2,100, Mw of 140,000 and Tg of 55° C. and a melt viscosity of 50,000 poise at 133° C. and homogeneously dissolved at about 125° C.

EXAMPLE 3

Into a separable flask equipped with a stirrer and a condenser, were charged 150 parts of (B-1) and 150 parts of xylene, followed by heating up to 50° C. and substituting the atmosphere with nitrogen. Then, 3 parts of methacryloyl socyanate were added thereto and reacted for 3 hours at 50° C. to obtain a xylene solution (S-1) of a mixture of (B-1) with a polyester (BW-1) having terminal double bond. Formation of urethane linkage was confirmed through proton NMR observing resonance at 5.7 ppm of proton linked to nitrogen atom of urethane group.

Into an autoclave, were charged 150 parts of xylene, followed by substituting the atmosphere with nitrogen and then heating up to 205° C. Then, keeping the temperature at 205° C., a mixture of 280 parts of (S-1), 770 parts of styrene and 12 parts of di-t-butylperoxide was added thereto dropwise over 3 hours. Thereafter, the resulting mixture was aged for 20 minutes at the same temperature and then cooled to obtain a solution (S-2) of a mixture of (B-1), a compatibilizer (C-2) and polystyrene (A-L-2). Analysis showed that the solid constituents (D-1) from (S-2) had Mn of 2,400, Mw of 5,300 and Tg of 54° C. (C-2) contained 59 parts of polyester moiety per 100 parts of (B-1), as calculated as follows:

$$(1-X_2/X_1) \times 100$$

wherein $X_1$ is (AV+OHV) of (B-1) before reaction, and $X_2$ is (AV+OHV) of solid constituents of the remainder of (D-1) from which the amount of monomers is subtracted.

Into a separable flask, were charged 135 parts of (S-2) and 40 parts of (A-H-1), followed by mixing them, distilling off the volatile matters, taking out and then cooling the mixture in the same manner as in Example 1. The surface temperature after 5 minutes was 16° C.

Analysis showed that the toner binder (TB-3) thus obtained had an average diameter of dispersed particles of 1.2 μ, Mn of 2,200, Mw of 110,000 and Tg of 56° C. and a melt viscosity of 50,000 poise at 133° C. and homogeneously dissolved at about 125° C.

EXAMPLE 4

Example 1 was repeated except that 120 parts of (B-1), 1,600 parts of (A-H-1) and 2,400 parts of a styrene/n-butyl acrylate (98/2) copolymer (A-L-3) were used to obtain a toner binder (TB-4) having an average diameter of dispersed particles of 2.4 μ, Mn of 3,100, Mw of 150,000 and Tg of 55° C. and a melt viscosity of 50,000 poise at 135° C. and homogeneously dissolved at about 125° C.

EXAMPLE 5

Into a flask equipped with a stirrer and a condenser, were charged 1,600 parts of (B-2) and 800 parts of xylene, followed by heating up to 50° C. and substituting the atmosphere with nitrogen. Then, 20 parts of methacryloyl isocyanate were added thereto and reacted for 3 hours at 50° C. to obtain a xylene solution (S-3) of a mixture of (B-2) with a polyester (BW-2) having terminal double bond. Formation of urethane linkage was confirmed through proton NMR observing resonance at 5.7 ppm of proton linked to nitrogen atom of urethane group.

Into an autoclave, were charged 1,860 parts of xylene, followed by substituting the atmosphere with nitrogen and then heating up to 195° C. Then, keeping the temperature at 195° C., a mixture of 1,630 parts of (S-3), 4,470 parts of styrene, 134 parts of acrylic acid, 813 parts of methyl methacrylate and 100 parts of di-t-butylperoxide was added thereto dropwise over 3 hours. Thereafter, the resulting mixture was aged for 20 minutes at the same temperature and then cooled to obtain a solution (S-4) of a mixture of (B-2), a compatibilizer (C-3) and styrene/acrylic acid/methyl methacrylate copolymer (A-L-4). Analysis showed that the solid constituents (D-2) from (S-4) had Mn of 1,900, Mw of 3,900 and Tg of 52° C. (C-3) contained 28 parts of polyester moiety per 100 parts of (B-2), as calculated as follows:

$$56{,}100 \times Y_1 \times 100/(X_1/2 - Y_1)$$

wherein $Y_1$ is number of moles of methacryloyl isocyanate per 1 g of (B-2) before reaction, and $X_1$ is (AV+OHV) of (B-2) before react ion.

Into a flask equipped with a stirrer and a condenser, were charged 500 parts of xylene, 3,530 parts of (S-4) and 1,600 parts of (A-H-1), and the atmosphere was substituted with nitrogen, followed heating them under stirring to reflux and continuing stirring for 3 hours under reflux. Then, the volatile matters were distilled off under normal pressure heating up to 180° C. and then under reduced pressure at 180° C., followed by continuing distillation for 1.5 hours after reaching 20 torrs. Thereafter, the molten mixture was quenched in the same manner as in Example 1 to obtain a toner binder (TB-4) having an average diameter of dispersed particles of 1.2 μ, Mn of 2,800, Mw of 140,000 and Tg of 54° C. and a melt viscosity of 50,000 poise at 133° C. and homogeneously dissolved at about 125° C.

EXAMPLE 6

Into a flask equipped with a stirrer and a condenser, were charged 1,000 parts of (B-3), followed by heating up to 150° C. under an atmosphere of nitrogen. Then, 40 parts of maleic anhydride were added thereto at 150° C. and reacted for 2 hours to obtain a mixture (S-5) of (B-3) with a polyester (BW-3) having terminal double bond.

Into an autoclave, were charged 1,600 parts of xylene, followed by substituting the atmosphere with nitrogen and then heating up to 195° C. Then, keeping the temperature at 195° C., a mixture of 600 parts of (S-5), 5,200 parts of styrene, 200 parts of acrylic acid and 165 parts of di-t-butylperoxide was added thereto dropwise over 3 hours. Thereafter, the resulting mixture was aged for 20 minutes at the same temperature and then cooled to obtain a solution (S-6) of a mixture of (B-3), a compatibilizer (C-4) and styrene/acrylic acid copolymer (A-L-5). Analysis showed that the solid constituents (D-3) from (S-6) had Mn of 2,200, Mw of 4,500, Tg of 52° C. and AV of 26 mgKOH/g. (C-4) contained 97 parts of polyester moiety per 100 parts of (B-3), as calculated as follows:

$$56{,}100 \times Y_2 \times 100/(X_1/2 - 56{,}100 \times Y_2)$$

wherein $Y_2$ is number of moles of maleic anhydride per 1 g of (B-3) before reaction, and $X_1$ is (AV+OHV) of (B-3) before reaction.

Into a flask equipped with a stirrer and a condenser, were charged 3,340 parts of (S-6) and 1,600 parts of (A-H-1), followed by mixing them, distilling off the volatile matters, taking out and then cooling the mixture same manner as in Example 1 to obtain a toner binder (TB-6) having an average diameter of dispersed particles less than 0.5 μ (*), Mn of 2,900, Mw of 140,000 and Tg of 53° C. and a melt viscosity of 50,000 poise at 133° C. and homogeneously dissolved at about 125° C. (*:could not observed with SEM).

COMPARATIVE EXAMPLE 4

Example 6 was repeated, except that 11.4 parts of maleic anhydride were used instead of 40 parts of maleic anhydride were used and that (B-3) was substituted with a polyester, having AV of 1.0 mgKOH/g and OHV of 25 mgKOH/g, Mn of 5,600, Mw of 11,000 and Tg of 64° C. and having a melt viscosity of 50,000 poise at 113° C., prepared by polycondensating 2,070 parts of ethylene oxide (2 moles) adduct of bisphenol A with 954 pars of terephthalic acid.

Analysis showed that the toner binder (TB-14) thus obtained had an average diameter of dispersed particles of 2.6 μ, Mn of 3,000, Mw of 140,000 and Tg of 58° C. and a melt viscosity of 50,000 poise at 146° C. and homogeneously dissolved at about 130° C.

EXAMPLES I–VI AND COMPARATIVE EXAMPLES I–IV

Preparation of Toners

To 88 parts of each toner binder, were added and homogeneously mixed 7 parts of carbon black (MA100 produced by Mitsubishi Chemical Industries), 3 parts of a low molecular weight polypropylene (Viscol 550P, produced by Sanyo Chemical Industries) and 2 parts of a charge controller (Spironblack TRH produced by Hodogaya Chemical Co.), and thereafter kneaded with a twin-screw extruder of bulk temperature 150° C., followed by finely pulverizing the cooled kneaded mixture with a jet mill and then classifying with a dispersion separator to obtain toners of 12 μ diameter (average).

Evaluation of Toners

1) To 3 parts of each toner were added and homogeneously mixed 97 parts of ferrite carrier (F-100 produced by Powderteck Co.), and fixing test was carried out as follows. By using a commercially available copy machine (BD-7720 produced by Toshiba Corp.), toner image was transferred onto paper, and then the transferred toner on the paper was fixed at a speed of 35 A4 sheets/minute with use of another commercially available copy machine (SF8400A produced by Sharp Corp.), whose fixing parts had been modified.

2) Each toner was put into a polyethylene bottle, and maintained at 45° C. within a constant temperature water bath. Then, the resulting toner was removed into a sieve of 42 mesh and shaken for 10 seconds using a powder tester (produced by Hosokawa-micron, Co. ). By measuring the weight % of the toner remained on the sieve, heat storage stability was evaluated. The smaller the weight 9° C. is, the better the heat storage stability is.

3) Into a 50 cm³ glass bottle, 30 parts of each toner and 97 parts of ferrite carrier (F-100 produced by Powderteck Co. ) were charged, and allowed to stand for 12 hours within a temperature and humidity controlled room of 25° C. and 50% R.H. Then, the resulting toner was stirred for 30 minutes at 100 r.p.m. with a tubular shaker mixer under conditions of 25° C. and 50% R.H. to be electrostatically charged by friction. Thereafter, the charged amount was measured with a blow-off charge amount measuring device produced by Toshiba, Corp.

The test results were as shown in Table 1.

TABLE 1

| | Example No. | | | | | | | | | |
|---|---|---|---|---|---|---|---|---|---|---|
| | Example | | | | | | Comparative Example | | | |
| Binder | I TB-1 | II TB-2 | III TB-3 | IV TB-4 | V TB-5 | VI TB-6 | I TB-11 | II TB-12 | III TB-13 | IV TB-14 |
| MF*1,°C. | 140 | 140 | 140 | 140 | 140 | 140 | 140 | 155 | 145 | 150 |
| HO*2,°C. | >220 | >220 | >220 | >220 | >220 | >220 | >220 | >220 | >220 | >220 |
| Heat stability, % | 34 | 32 | 28 | 34 | 32 | 28 | 73 | 27 | 61 | 26 |
| Charge amount, μ c/g | −21 | −21 | −22 | −21 | −21 | −19 | −13 | −22 | −21 | −19 |

Notes

*1: the temperature of the heated roller providing printed image density of solid part remained at least 70% after 5 times reciprocating rubbing of black solid part of printed image density 1.2 with a Gakushin fastness tester (rabbed part=paper).

2*: the temperature of the heated roller at the time when the toner was hot offset.

As shown in Table 1, toners of Examples I–VI obtained using Binders TB-1, TB-2, TB-3, TB-4, TB-5 and TB-6 of this invention exhibited well balanced low temperature fixability and cohesiveness as compared with toners of Comparative Examples I–IV, and improved dispersibility and charging properties as compared with toner of Comparative Examples I and IV. This application corresponds to Application No. 283766/1992 filed in Japan on Sep. 28, 1992, the contents of which are hereby incorporated by reference.

What is claimed as new and desired to be secured by Letters Patent is:

1. A resin composition suitable for electrophotographic toner, which comprises (A) a non-crosslinked polymer having a glass transition temperature of 55°–80° C., obtained by polymerizing (a) one or more styrenic monomers, or (b) one or more acrylic or methacrylic monomers, or mixtures of (a) and (b), or any of the foregoing with another monomer (c), (B) a non-crosslinked non-crystallizable saturated polyester having a glass transition temperature of 36°–60° C., and optionally (C) a compatibilizer, wherein said compatibilizer is a graft or block polymer having a moiety of polymer of at least one monomer selected from the group consisting of styrenic monomer and acrylic or methacrylic monomer, and a moiety of a polyester, and wherein said polyester (B) is dispersed, within a matrix of said polymer (A), with an average particle size of not more than 3 μ, and wherein said composition of (A) and (B) and optionally (C) has a number-average molecular weight of about 2,000 to about 15,000 and weight-average molecular weight of about 100,000 to about 1,000,000.

2. The composition of claim 1, wherein the temperature when the composition has a melt viscosity of 50,000 poises is higher by at least 30° C. than the temperature when said polyester (B) has a melt viscosity of 50,000 poises.

3. The composition of claim 1, wherein said polymer (A) has an acid number of not more than 30, and said polyester (B) has a hydroxyl number of not more than 120 and an acid number of not more than 5.

4. The composition of claim 1, which comprises 2–20% by weight of said polyester (B) and 80–98% by weight of said polymer (A).

5. The composition of claim 1, wherein said monomer (a) is styrene.

6. The composition of claim 1, wherein said monomer (b) is at least one monomer selected from the group consisting of acrylic acid esters and methacrylic acid esters.

7. The composition of claim 1, wherein said polymer (A) is a copolymer of said monomer (a) and said monomer (b), with or without another monomer (c).

8. The composition of claim 7, wherein said copolymer contains at least 50% by weight of the monomer (a) units, 2–50% by weight of the monomer (b) units, and 0–10% by weight of the monomer (c) units.

9. The composition of claim 8, wherein said monomer (c) is at least one monoethylenically unsaturated monomer selected from the group consisting of aliphatic hydrocarbon monomers, vinyl esters, alpha-methylene aliphatic monocarboxylic acid monomers and unsaturated nitriles.

10. The composition of claim 1, wherein said polymer (A) has a number-average molecular weight of about 2,000 to about 20,000 and a weight-average molecular weight of about 100,000 to about 2,000,000.

11. The composition of claim 1, wherein said polyester (B) is a polycondensate of at least one dicarboxylic acid component with at least one diol selected from the group consisting of aliphatic diols, dihydric phenols and alkylene oxide adducts thereof.

12. The composition of claim 11, wherein said dicarboxylic acid component is selected from the group consisting of succinic, maleic, fumaric, itaconic, azelaic, mesaconic, citraconic, adipic, sebacic, glutaric, glutaconic, malonic, azelaic, fumaric, maleic, phthalic, iso-phthalic, terephthalic, cyclohexane dicarboxylic, nadic, methylnadic and $C_{4-18}$alkyl- or alkenyl-substituted succinic acids, anhydrides of said acids and esters of said acids.

13. The composition of claim 1, which further contains (C) a compatibilizer.

14. The composition of claim 13, wherein the compatibilizer (C) is a graft or block polymer of unsaturated polyester with at least one monomer selected from the group consisting of styrenic monomer and acrylic or methacrylic monomer.

15. The composition of claim 14, wherein the unsaturated polyester is a reaction product of a hydroxyl-terminated polyester with methacryloyl isocyanate or maleic anhydride.

16. The composition of claim 1, which contains the compatibilizer (C) in such an amount providing 5–120 parts by weight of the polyester moiety of (C) per 100 parts by weight of said polyester (B).

17. The resin composition of claim 1, produced by quenching a mixture of said polymer (A) and said polyester (B), heated to a temperature of 150°–200° C., below the glass transition temperature of the polymer (A) within 5 minutes to disperse said polyester (B) to particles of an average particle size of not more than 3 μ.

18. The composition of claim 17, wherein said mixture further contains (C) a compatibilizer.

19. The resin composition of claim 1, wherein said polyester (B) has a number-average molecular weight of 1,000–4,000.

20. The resin composition of claim 1, wherein the glass transition temperature of said polyester (B) is lower by at least 5° C. than the glass transition temperature of said polymer (A).

* * * * *